(12) United States Patent
Lemmers, Jr. et al.

(10) Patent No.: US 12,323,027 B2
(45) Date of Patent: Jun. 3, 2025

(54) SEAL COOLING SYSTEMS

(71) Applicant: Hamilton Sundstrand Corporation, Charlotte, NC (US)

(72) Inventors: Glenn C. Lemmers, Jr., Loves Park, IL (US); Mark J. Franklin, Janesville, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 308 days.

(21) Appl. No.: 18/105,747

(22) Filed: Feb. 3, 2023

(65) Prior Publication Data

US 2024/0291344 A1   Aug. 29, 2024

(51) Int. Cl.
| | |
|---|---|
| H02K 5/20 | (2006.01) |
| F02C 7/16 | (2006.01) |
| F02C 7/28 | (2006.01) |
| H02K 5/22 | (2006.01) |
| H02K 7/18 | (2006.01) |
| H02K 9/19 | (2006.01) |

(52) U.S. Cl.
CPC ............... *H02K 5/203* (2021.01); *F02C 7/16* (2013.01); *F02C 7/28* (2013.01); *H02K 5/225* (2013.01); *H02K 7/1823* (2013.01); *H02K 9/19* (2013.01); *F05D 2240/55* (2013.01); *F05D 2260/232* (2013.01)

(58) Field of Classification Search
CPC ...... H02K 5/203; H02K 5/225; H02K 7/1823; H02K 9/19; F02C 7/16; F02C 7/28; F05D 2240/55; F05D 2260/232; F05D 2220/50; F05D 2220/76; F01D 25/12; F01D 25/24; F01D 25/30; F01D 15/10
USPC ........................................................... 310/54
See application file for complete search history.

(56) References Cited

U.S. PATENT DOCUMENTS

| | | | |
|---|---|---|---|
| 4,712,029 A | 12/1987 | Nold | |
| 5,593,165 A * | 1/1997 | Murray | F16J 15/164 |
| | | | 415/110 |

(Continued)

FOREIGN PATENT DOCUMENTS

| | | |
|---|---|---|
| EP | 3708787 A1 | 9/2020 |
| EP | 3708788 A1 | 9/2020 |
| EP | 3879074 A1 | 9/2021 |

OTHER PUBLICATIONS

European Search Report dated Jul. 2, 2024 in connection with European Patent Application No. 24155052.4, 5 pages.

*Primary Examiner* — Ahmed Elnakib (57) ABSTRACT

A generator assembly for a high temperature environment that exceeds a seal temperature limit in operation can include a generator housing enclosing one or more generator components and one or more attached components sealed to the housing. The assembly can include one or more seals disposed between each of the one or more attached components and the generator housing and an oil circuit within the housing configured to circulate oil. The assembly can include one or more oil spray orifices within the housing and in fluid communication with the oil circuit. Each of the one or more oil spray orifices can be directed at an interior portion of the one or more attached components and/or an interior housing area adjacent the one or more attached components to provide oil spray thereto for cooling each of the one or more seals to maintain the one or more seals below the seal temperature limit.

20 Claims, 7 Drawing Sheets

(56) References Cited

U.S. PATENT DOCUMENTS

| | | | |
|---|---|---|---|
| 6,196,790 B1* | 3/2001 | Sheridan | F16J 15/3472 |
| | | | 415/231 |
| 6,628,024 B1 | 9/2003 | Mirmobin | |
| 10,196,935 B2 | 2/2019 | Deane et al. | |
| 11,371,521 B2* | 6/2022 | Chandramohanan | ........................ |
| | | | F04D 29/124 |
| 12,203,412 B2* | 1/2025 | Witlicki | F02C 7/06 |
| 2008/0093850 A1* | 4/2008 | Taneja | H02K 3/527 |
| | | | 244/53 A |
| 2014/0265145 A1* | 9/2014 | Copeland, III | F02C 7/28 |
| | | | 277/358 |
| 2014/0369832 A1* | 12/2014 | Blais | F01D 25/12 |
| | | | 277/306 |
| 2016/0032765 A1* | 2/2016 | Shuaib | F16C 33/6637 |
| | | | 277/348 |
| 2016/0032771 A1* | 2/2016 | Vdoviak, Jr. | F01D 25/183 |
| | | | 277/358 |
| 2016/0348792 A1* | 12/2016 | Labbe | F16J 15/24 |
| 2020/0180235 A1* | 6/2020 | Davis | F16J 15/3284 |
| 2020/0386168 A1* | 12/2020 | Nasman | F16J 15/3404 |
| 2021/0281145 A1 | 9/2021 | Lemmers, Jr. | |
| 2024/0291344 A1* | 8/2024 | Lemmers, Jr. | H02K 5/225 |

* cited by examiner

SEAL COOLING SYSTEMS

FIELD

This disclosure relates to seal cooling systems.

BACKGROUND

Elastomeric sealing of generator sub-assemblies can be used (e.g., for sealing fluid lines for example). However, there is no traditional method to allow use of such seals while operating in a high ambient temperature environment (e.g., in an engine tail cone environment).

Such conventional methods and systems have generally been considered satisfactory for their intended purpose. However, there is still a need in the art for improvements. The present disclosure provides a solution for this need.

SUMMARY

A generator assembly for a high temperature environment that exceeds a seal temperature limit in operation can include a generator housing enclosing one or more generator components and one or more attached components sealed to the housing. The assembly can include one or more seals disposed between each of the one or more attached components and the generator housing and an oil circuit within the housing configured to circulate oil. The assembly can include one or more oil spray orifices within the housing and in fluid communication with the oil circuit. Each of the one or more oil spray orifices can be directed at an interior portion of the one or more attached components and/or an interior housing area adjacent the one or more attached components to provide oil spray thereto for cooling each of the one or more seals to maintain the one or more seals below the seal temperature limit.

The one or more seals can be elastomeric, for example. The high temperature environment can be a hot turbine exhaust environment. The high temperature environment can be over 1,000 degrees F. in operation, for example. In certain embodiments, the oil circuit can be configured to provide cooling to one or more generator components within the housing.

The one or more attached components can include an electrical connector. The one or more seals can include an electrical connector seal.

The one or more attached components can include an air line fitting. The one or more seals can include an air line fitting seal.

In certain embodiments, the assembly can further include an oil line fitting. In certain embodiments, the oil line fitting does not have an oil spray orifice directed thereto.

The one or more attached components can include a cap bolted to the housing. The one or more seals can include a cap seal.

The one or more attached components can include a plurality of terminal lead insulators arranged in one or more groups. The oil circuit can include an orifice tube for each group. Each orifice tube can have a spray orifice defined therein directed at a respective terminal lead insulator. Each terminal lead insulator can include a plurality of seals, for example.

In accordance with at least one aspect of this disclosure, a turbomachine can include a tail cone generator assembly disposed in a tail cone and exposed to an environment that exceeds a seal temperature limit in operation. The tail cone generator assembly can be or include any suitable assembly disclosed herein, e.g., as described above.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
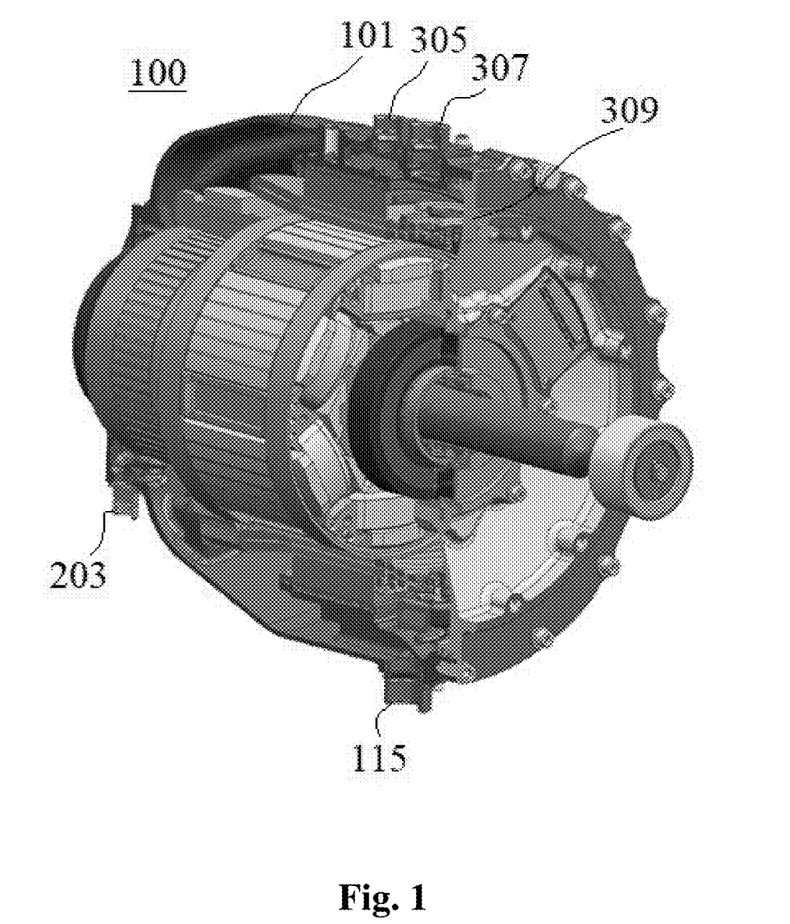
FIG. 1 is a partial cross-sectional view of an embodiment of a generator assembly in accordance with this disclosure.

Reference will now be made to the drawings wherein like reference numerals identify similar structural features or aspects of the subject disclosure. For purposes of explanation and illustration, and not limitation, an illustrative view of an embodiment of a generator assembly in accordance with the disclosure is shown in FIG. 1 and is designated generally by reference character 100. Other embodiments and/or aspects of this disclosure are shown in FIGS. 2-6. Certain embodiments described herein can be used to enable use of elastomeric seals in a tail cone generator assembly.

Referring to FIGS. 1-4B generally, a generator assembly 100 for a high temperature environment that exceeds a seal temperature limit in operation can include a generator housing 101 enclosing one or more generator components (e.g., electrical machine components such as coils, stators, cores, rotors, etc.). The generator assembly 100 can also include one or more attached components 203, 305, 307, 309, 411 sealed to the housing 101.

The assembly 100 can include one or more seals 213, 313, 327, 413 (e.g., o-ring seals) disposed between each of the one or more attached components 203, 305, 307, 309, 411 and the generator housing 101. The assembly 100 can include an oil circuit 114 within the housing 101 configured to circulate oil (e.g., via a pump that pressurizes oil). For example, oil can be circulated within the housing 101 and be gravitationally directed to a bottom sump 115 of the housing 101. The assembly 100 can include one or more oil spray orifices 217, 319, 321, 423 within the housing 101 and in fluid communication with the oil circuit 114. Each of the one or more oil spray orifices 217, 319, 321, 423 can be directed at an interior portion of the one or more attached components 203, 305, 307, 309, 411 and/or an interior housing area adjacent the one or more attached components 203, 305, 309, 411 to provide oil spray thereto for cooling each of the one or more seals 213, 313, 327, 413 to maintain the one or more seals 213, 313, 327, 413 below the seal temperature limit.

For example, the one or more seals 213, 313, 327, 413 can be elastomeric, for example. The one or more seals 213, 313, 327, 413 can be made of a fluoroelastomer for example (e.g., Viton™ GLT elastomer). In certain embodiments, the one or more seals 213, 313, 327, 413 can have a maximum high temperature limit of about 440 degrees F. (about 230 degrees C.).

Figure 2:
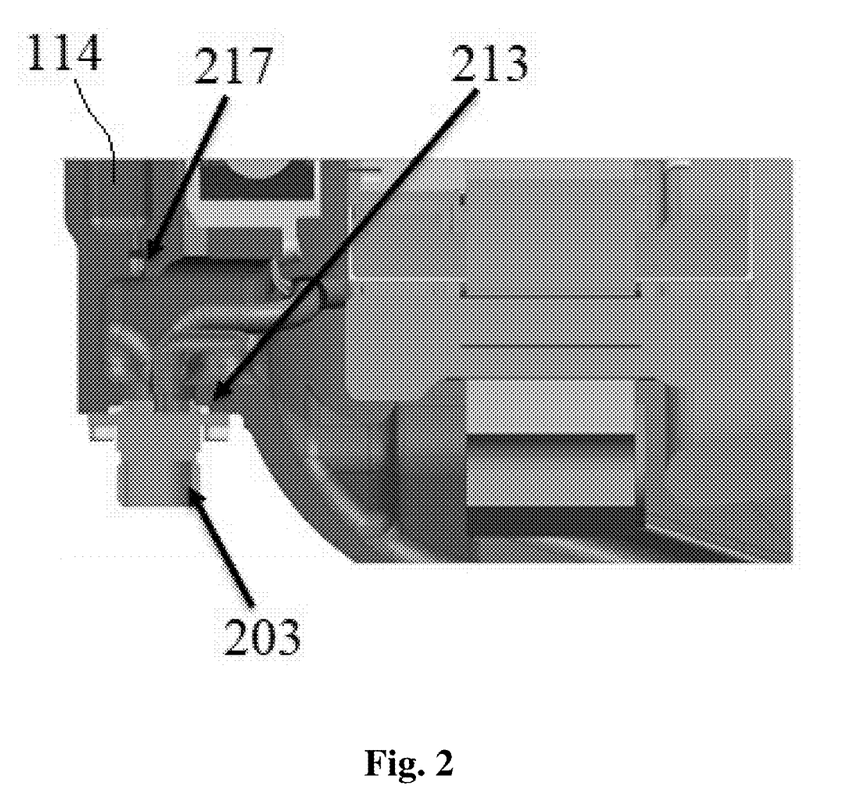
FIG. 2 is a cross-sectional view of a portion of the embodiment of FIG. 1, showing a spray orifice directed at an interior surface of an electrical connector.

In certain embodiments, the high temperature environment can be a hot turbine exhaust environment. For example, the high temperature environment can be over 1,000 degrees F. (e.g., about 1250 degrees F.) in operation. In certain embodiments, the oil circuit 114 can be configured to provide cooling to one or more generator components (e.g., a stator 116 as shown in FIG. 2) within the housing 101. The one or more spray orifices 217, 319, 321, 423 can be sized and positioned to effect suitable cooling of each respective seal 213, 313, 327, 413 (e.g., relative dimensions as shown in the figures). One having ordinary skill in the art in view of this disclosure appreciates how to select parameters (directionality, spray type, amount of flow, size of the orifice, pressure effects, etc.) to effect the desired amount of cooling without undue experimentation.

Referring to FIG. 2, the one or more attached components 203, 305, 307, 309, 411 can include an electrical connector 203. The one or more seals 213, 313, 327, 413 can include an electrical connector seal 213, for example. The spray orifice 217 can be directed toward an interior side of the electrical connector 203 to spray oil thereon to cool the seal 213.

Figure 3:
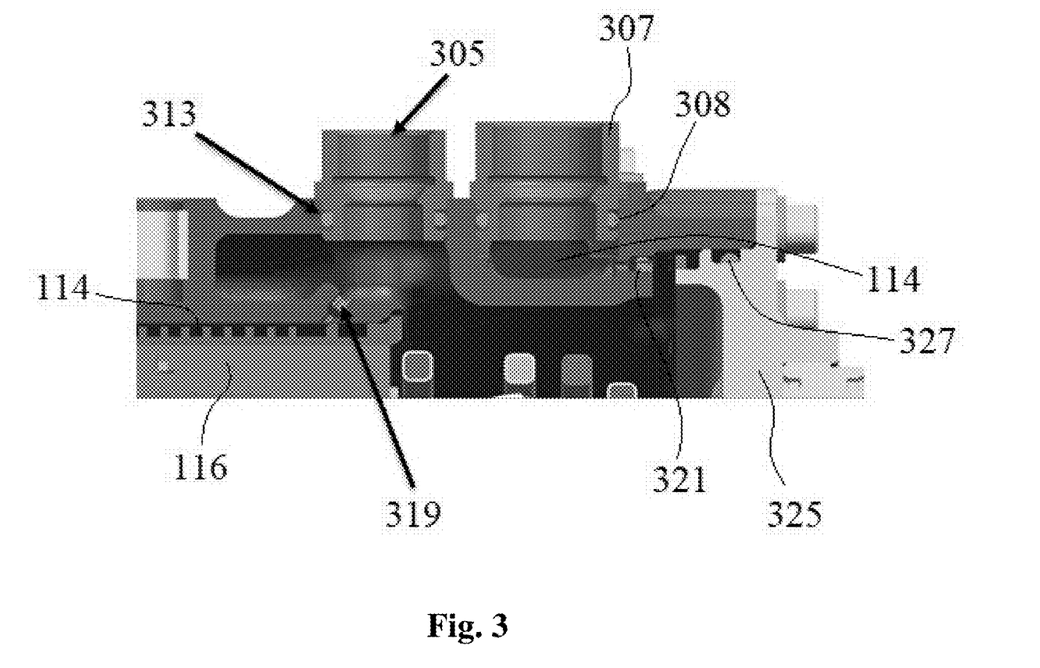
FIG. 3 is a cross-sectional view of a portion of the embodiment of FIG. 1, showing a spray orifice directed at an interior surface of an air line fitting, and a spray orifice directed at a cap.

Referring to FIG. 3, the one or more attached components 203, 305, 307, 309, 411 can include an air line fitting 305. The one or more seals 213, 313, 327, 413 can include an air line fitting seal 313. The spray orifice 319 can be directed toward an interior side of the air line fitting 305 to spray oil thereon to cool the seal 313. The spray orifice 319 can be angled relative to the fitting 305, for example, and can spray in inside channel of the fitting 305. The oil received by the oil spray orifice 319 can be received from a stator portion of the oil circuit 114.

In certain embodiments, the assembly 100 can further include an oil line fitting 307. In certain embodiments, e.g., as shown the oil line fitting 307 does not have an oil spray orifice directed thereto. For example, because oil is already flowing through the oil line fitting 307, the oil line fitting seal 308 stays cool. Any other suitable oil circuit component may not require an associate spray orifice also (e.g., the sump 115, for example)

The one or more attached components 203, 305, 307, 309, 411 can include a cap 325 bolted to the housing 101. The one or more seals 213, 313, 327, 413 can include a cap seal 327. The spray orifice 321 can be directed toward an interior side of the cap 325 (e.g., near the seal 327) to spray oil thereon to cool the seal 327.

Figure 4A:
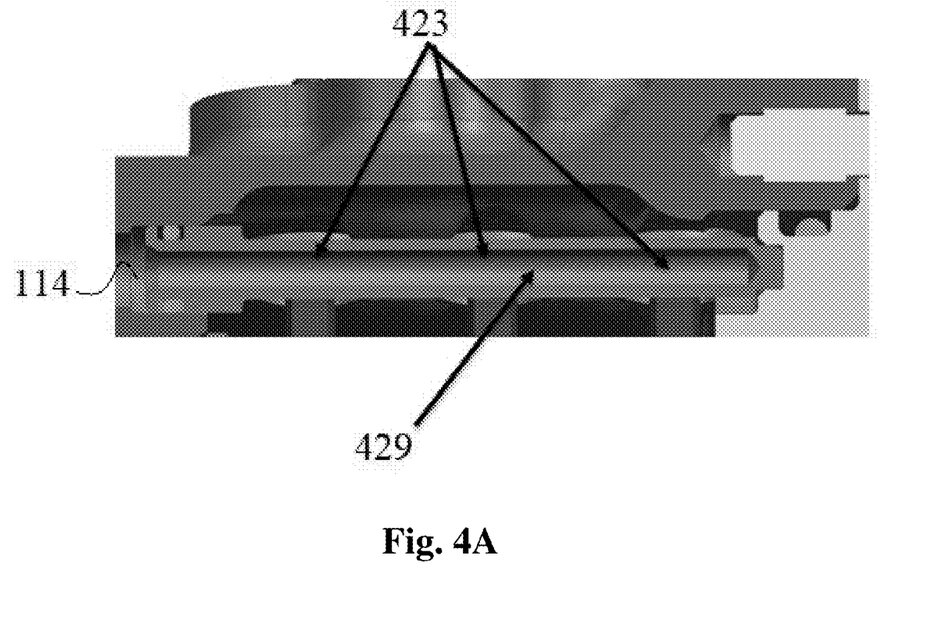
FIG. 4A is a cross-sectional view of a portion of the embodiment of FIG. 1, showing an orifice tube having a plurality of spray orifices directed at a respective interior surface of a respective terminal insulator.
Figure 4B:
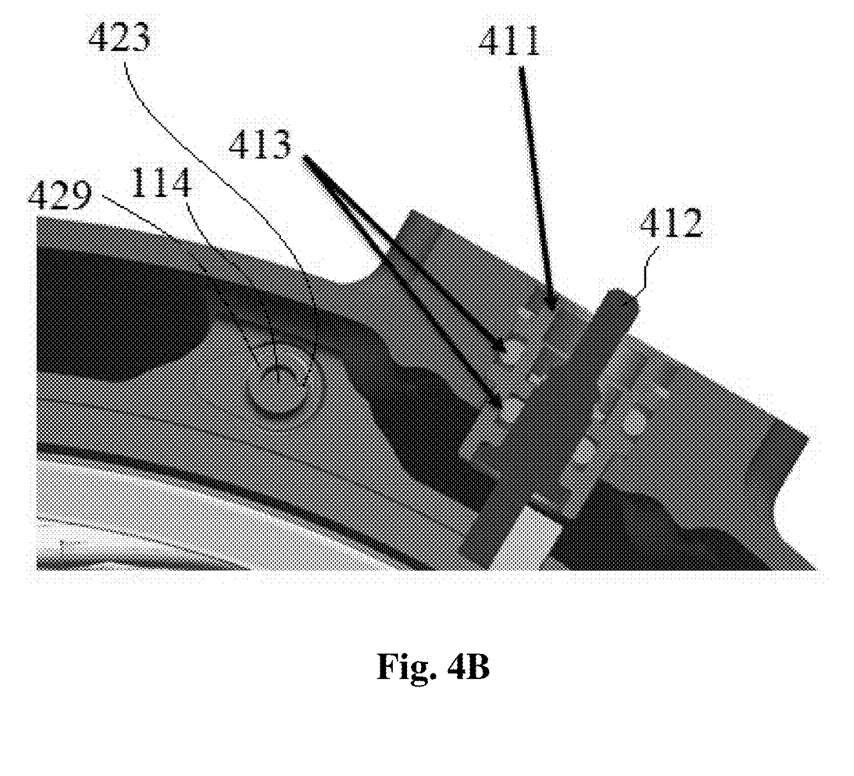
FIG. 4B is a transverse cross-sectional view of the embodiment of FIG. 4A.

Referring to FIGS. 4A and 4B, the one or more attached components 203, 305, 307, 309, 411 can include a plurality of terminal lead insulators 411 arranged in one or more groups (e.g., a line of three insulators 411 having terminals 412 disposed therein). The oil circuit 114 can include an orifice tube 429 for each group. The orifice tube 429 can have a terminal spray orifice 423 defined therein directed at a respective terminal lead insulator 411, e.g., as shown. Each terminal lead insulator 411 can include a plurality of seals 413, for example, e.g., as shown. As shown, the orifice tube 429 can have three spray orifices 423, each one directed for spraying at a respective terminal insulator 411. The assembly 100 can include four tubes 429 spaced evenly, such that there are twelve total terminal insulators 411/terminals 412.

Certain examples of attached components having seals are disclosed above. However, it is contemplated that any other suitable components, attached to the housing 101 or otherwise located on or within the housing 101 can be cooled using a spray orifice to maintain a temperature below a critical temperature.

Figure 5:
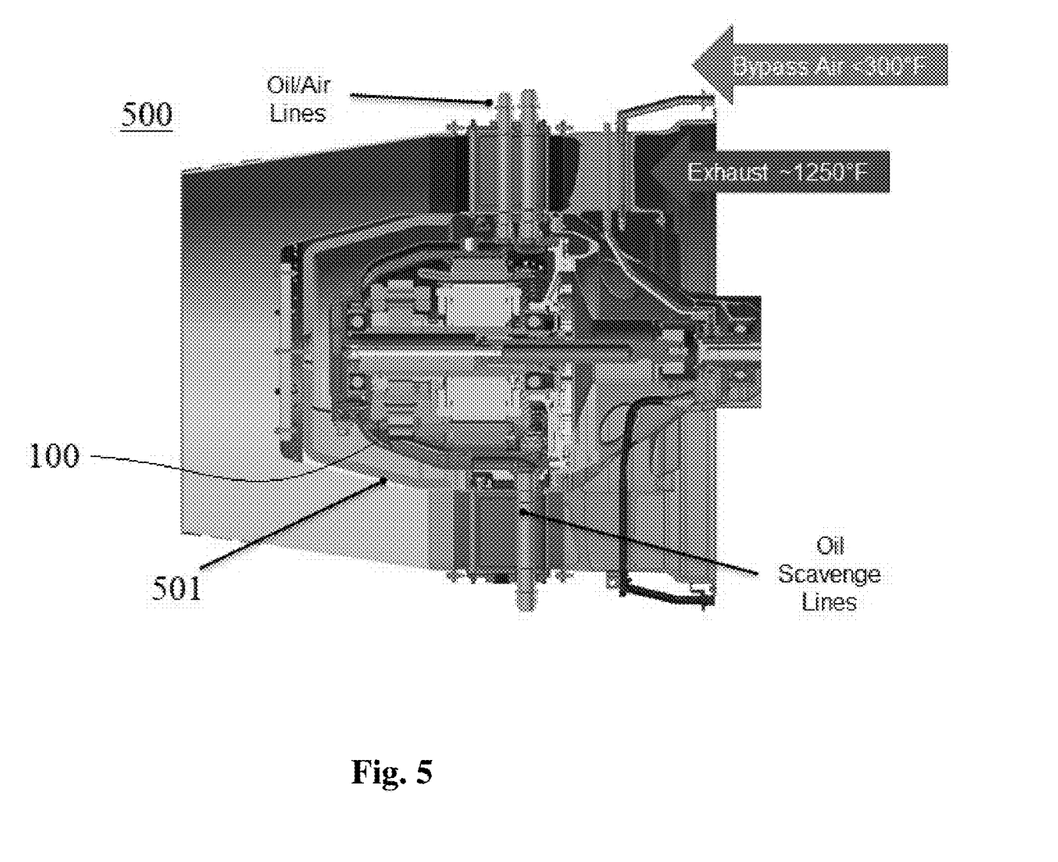
FIG. 5 is a cross-sectional view of the embodiment of FIG. 1, shown disposed in a tail cone of a turbomachine.
Figure 6:
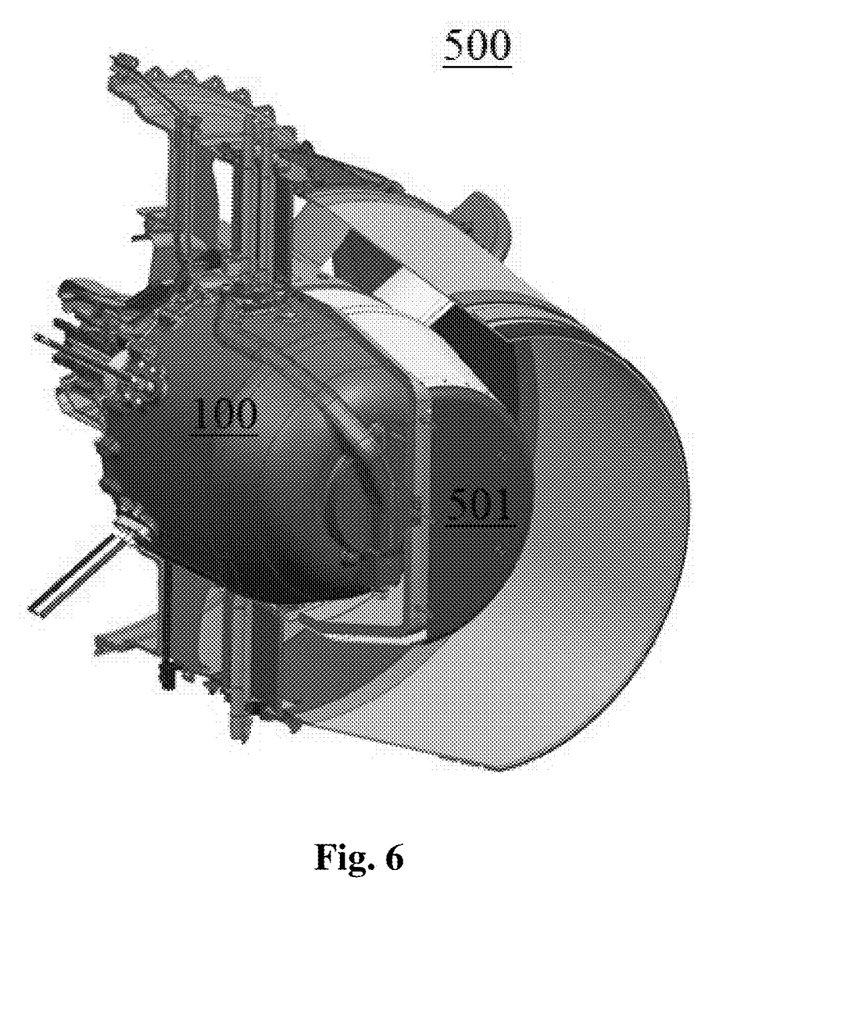
FIG. 6 is a partially sectioned perspective view of the embodiment of FIG. 5.

In accordance with at least one aspect of this disclosure, referring additionally to FIGS. 5 and 6, a turbomachine (not shown in entirety) can include a tail cone generator assembly 500 disposed in an tail cone 501 and exposed to an environment that exceeds a seal temperature limit in operation (e.g., turbine exhaust gases). The tail cone generator assembly 500 can be or include any suitable assembly 100 disclosed herein, e.g., as described above.

Embodiments can spray oil in the area around o-rings to convectively cool each o-ring. The size of spray orifices can be a function of supply pressure and desired cooling effect, and a person having ordinary skill in the art can determine what sizes, pressures, and amount of flow is needed for a particular application without undue experimentation. For example, in an aircraft related application, the orifices can be designed to use a minimum amount required for suitable cooling to reduce weight and pump losses, for example.

Embodiments can include a scavenge pump connected to the sump 115 at the bottom of the housing, for example. Oil within the housing can make its way due to gravity to the sump 115, and then flow to a heat exchanger to be cooled and reused. In a turbine application, ambient temperature can be about 500 degrees C. which would melt standard elastomer o-rings.

Embodiments allow for the use of standard low cost fluoroelastomer seals (e.g., Viton™ GLT o-rings) which can perform during −40° C. engine cold starts while also staying below the elastomer temperature limit while operating in the high ambient temperature (e.g., in a tail cone of a turbomachine).

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A generator assembly for a high temperature environment that exceeds a seal temperature limit in operation, the assembly including:
   a generator housing enclosing one or more generator components;
   one or more attached components sealed to the housing;
   one or more seals disposed between each of the one or more attached components and the generator housing;
   an oil circuit within the housing configured to circulate oil; and
   one or more oil spray orifices within the housing and in fluid communication with the oil circuit, each of the one or more oil spray orifices directed at an interior portion of the one or more attached components and/or an interior housing area adjacent the one or more attached components to provide oil spray thereto for cooling each of the one or more seals to maintain the one or more seals below the seal temperature limit.

2. The assembly of claim 1, wherein the one or more seals are elastomeric.

3. The assembly of claim 2, wherein the high temperature environment is a hot turbine exhaust environment.

4. The assembly of claim 3, wherein the high temperature environment is over 1,000 degrees F. in operation.

5. The assembly of claim 4, wherein the oil circuit is configured to provide cooling to the one or more generator components within the housing.

6. The assembly of claim 5, wherein the one or more attached components include an electrical connector, wherein the one or more seals include an electrical connector seal.

7. The assembly of claim 5, wherein the one or more attached components include an air line fitting, wherein the one or more seals include an air line fitting seal.

8. The assembly of claim 7, further comprising an oil line fitting, wherein the oil line fitting does not have an oil spray orifice directed thereto.

9. The assembly of claim 5, wherein the one or more attached components include a cap bolted to the housing, wherein the one or more seals include a cap seal.

10. The assembly of claim 5, wherein the one or more attached components include a plurality of terminal lead insulators arranged in one or more groups, wherein the oil circuit includes an orifice tube for each group, each orifice tube having a spray orifice defined therein directed at a respective terminal lead insulator.

11. The assembly of claim 10, wherein each terminal lead insulator includes a plurality of seals.

12. A turbomachine, comprising:
   a tail cone generator assembly disposed in a tail cone and exposed to an environment that exceeds a seal temperature limit in operation, the generator assembly including:
      a generator housing enclosing one or more generator components;
      one or more attached components sealed to the housing;
      one or more seals disposed between each of the one or more attached components and the generator housing;
      an oil circuit within the housing configured to circulate oil; and
      one or more oil spray orifices within the housing and in fluid communication with the oil circuit, each of the one or more oil spray orifices directed at an interior portion of the one or more attached components and/or an interior housing area adjacent the one or more attached components to provide oil spray thereto for cooling each of the one or more seals to maintain the one or more seals below the seal temperature limit.

13. The turbomachine of claim 12, wherein the one or more seals are elastomeric.

14. The turbomachine of claim 13, wherein the environment is a hot turbine exhaust environment.

15. The turbomachine of claim 14, wherein the environment is over 1,000 degrees F. in operation.

16. The turbomachine of claim 15, wherein the oil circuit is configured to provide cooling to the one or more generator components within the housing.

17. The turbomachine of claim 16, wherein the one or more attached components include an electrical connector, wherein the one or more seals include an electrical connector seal.

18. The turbomachine of claim 16, wherein the one or more attached components include an air line fitting, wherein the one or more seals include an air line fitting seal.

19. The turbomachine of claim 18, further comprising an oil line fitting, wherein the oil line fitting does not have an oil spray orifice directed thereto.

20. The turbomachine of claim 16, wherein the one or more attached components include a cap bolted to the housing, wherein the one or more seals include a cap seal.

* * * * *